S. C. STINER & R. H. KEHRING.

APPARATUS FOR THE MANUFACTURE OF TIN OR LIKE PLATES.

APPLICATION FILED JAN. 14, 1910.

Reissued Aug. 29, 1911.

13,287.

2 SHEETS—SHEET 1.

WITNESSES.

J. R. Keller

Robert C. Totten

INVENTOR.

Savanus C. Steiner and Robert H. Kehring

By Kay & Totten

Attorneys

S. C. STINER & R. H. KEHRING.
APPARATUS FOR THE MANUFACTURE OF TIN OR LIKE PLATES.
APPLICATION FILED JAN. 14, 1910.
Reissued Aug. 29, 1911. 13,287.
2 SHEETS—SHEET 2.
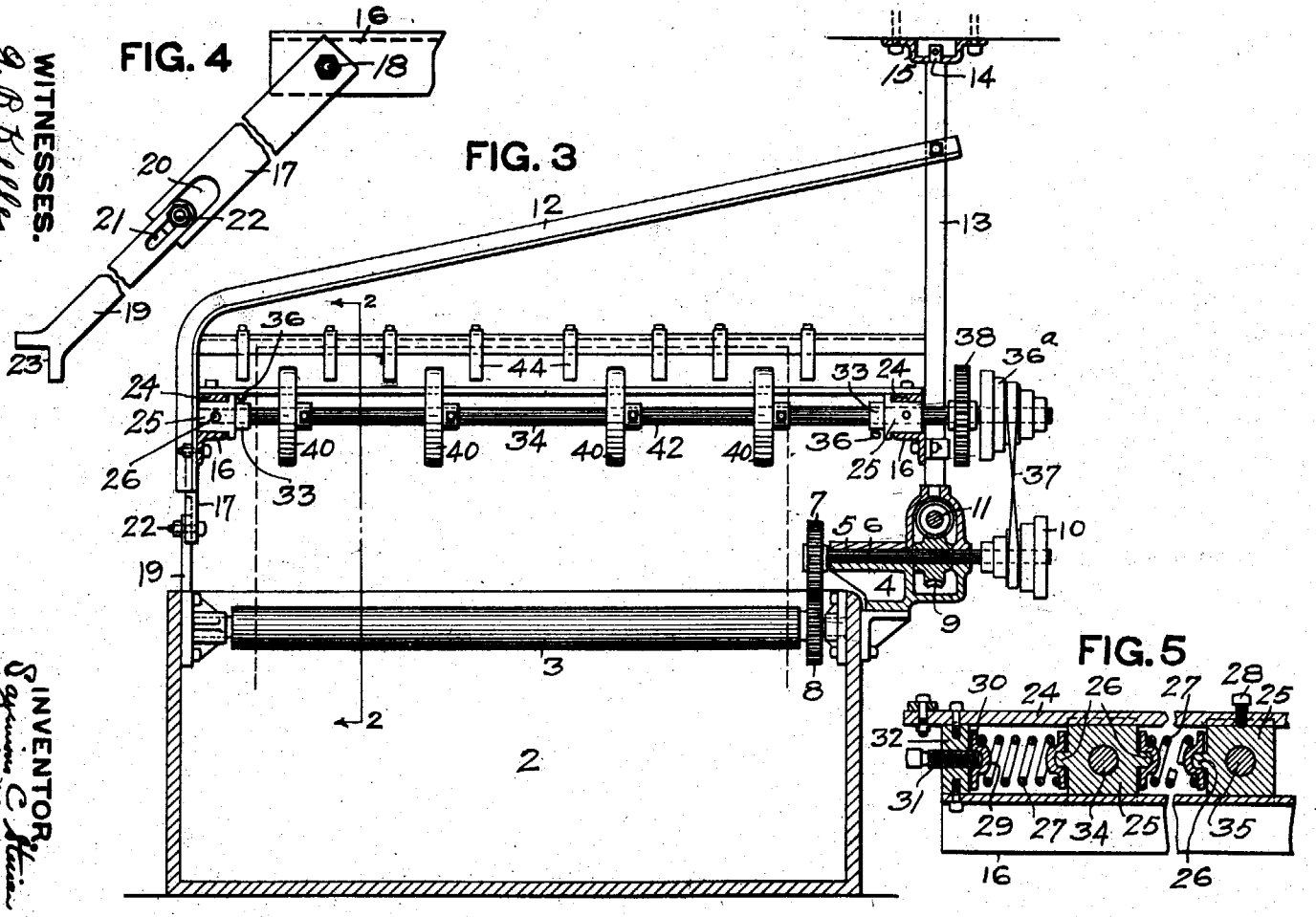
WITNESSES.
J. R. Keller
Robert C. Totten
INVENTOR.
Samuel C. Stiner and Robert H. Kehring
By Ray L. Totten
Attorney

UNITED STATES PATENT OFFICE.

SAVENIOUS C. STINER AND ROBERT H. KEHRING, OF McKEESPORT, PENNSYLVANIA.

APPARATUS FOR THE MANUFACTURE OF TIN OR LIKE PLATES.

13,287. Specification of Reissued Letters Patent. Reissued Aug. 29, 1911.

Original No. 930,501, dated August 10, 1909, Serial No. 491,651. Application for reissue filed January 14, 1910. Serial No. 538,335.

*To all whom it may concern:*

Be it known that we, SAVENIOUS C. STINER and ROBERT H. KEHRING, citizens of the United States, residing at McKeesport, county of Allegheny, State of Pennsylvania, have invented a new and useful Apparatus for the Manufacture of Tin or Like Plates, of which the following is a specification.

Our invention relates to apparatus for use in connection with the manufacture of tin or like coated plates.

One of the objects of our invention is to provide for the use of solid metal disks with hard faces in connection with the catching of the plates as they come from the tin-pot, whereby a much stronger and more durable construction is provided and at the same time one which will not mark the plates.

A further object of our invention is to provide for the quick and convenient removal of the apparatus when it is desired to adjust the rolls in the tin-pot, or for any other purpose.

To these ends our invention comprises the novel features hereinafter set forth and claimed.

Figure 1:
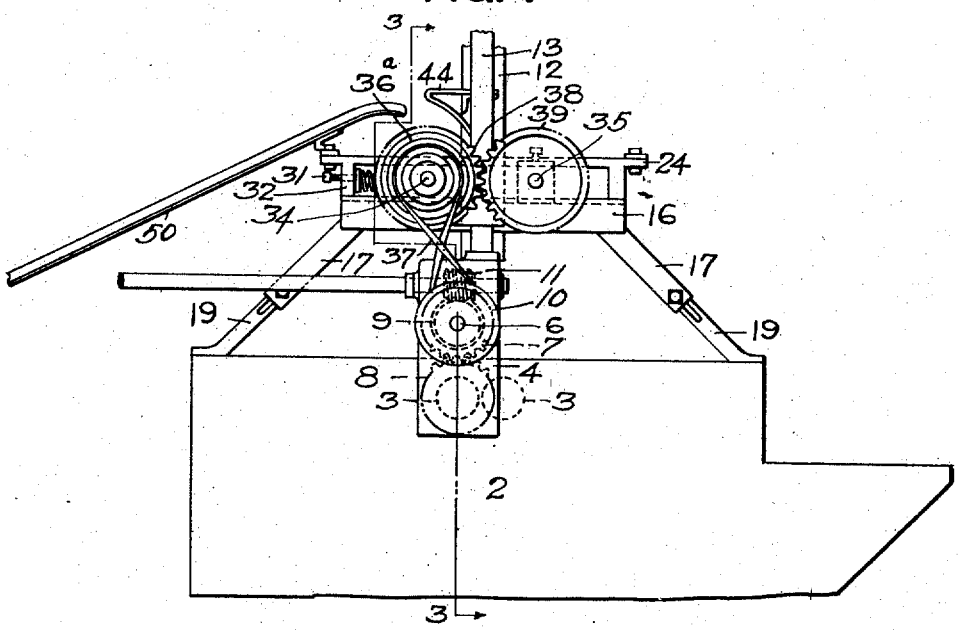
Figure 2:
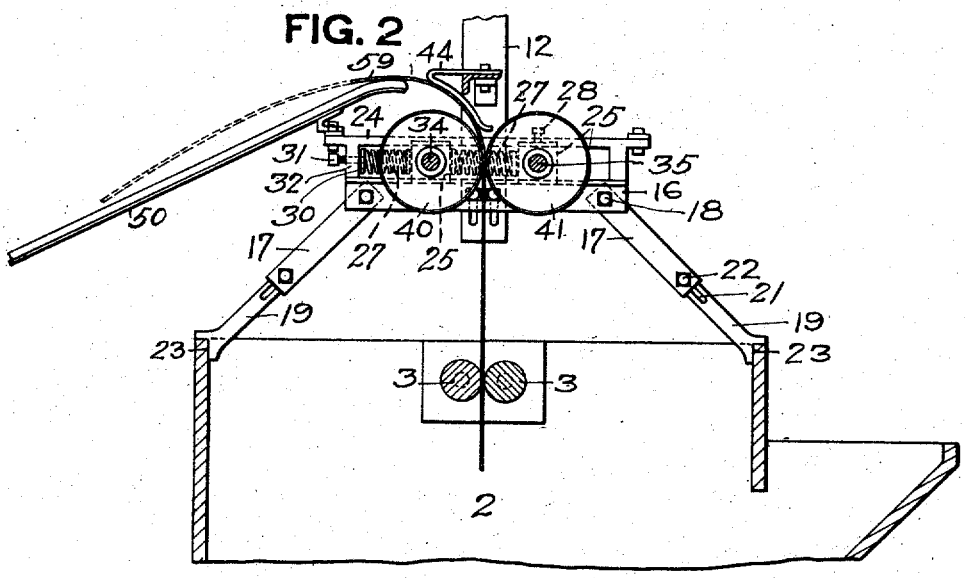

In the drawings Figure 1 is a side elevation of our improved catcher; Fig. 2 is a cross section on the line 2—2, Fig. 3; Fig. 3 is a section on the line 3—3 Fig. 1; Figs. 4 and 5 are enlarged details on the adjustable legs and bearing boxes.

In the drawings the numeral 2 designates a tin-pot of any suitable construction, which it has not been deemed necessary to illustrate in detail. At the upper end of the tin-pot are mounted the rolls 3 for feeding the plates from the pot. Secured to the tin-pot 2 is the bracket 4 which has the bearing 5 to receive the shaft 6. At the inner end of the shaft 6 is the gear-wheel 7 which meshes with the gear-wheel 8 on one of the tin rolls 3. On the shaft 6 is the worm-wheel 9 and at the outer end of said shaft is the cone or graduated pulley 10. Mounted in suitable bearings in the bracket 4 is the worm-shaft 11 which meshes with the worm-wheel 9. This worm-shaft 11 is driven from any suitable source of power.

The catcher frame 12 may be made up of suitable angle-bars and bracing-rods connected together to form a strong rigid frame, said frame having a mast or column 13 which is provided at its upper and lower ends with the journals 14, the upper journal engaging a seat in the bracket 15 and the lower journal engaging a seat in the bracket 4. The mast or column 13 is free to rotate on its bearing and the frame 12 is thus adapted to swing in a horizontal plane. Secured to the outer cross-bar 16 of the frame 12 are the bars 17, said bars being adjustably secured to the cross-bars 16 by means of the bolts 18. These bars 17 project at an angle from the frame and supported by said bars are the legs 19 which are adapted to engage the edges of the tin-pot 2. For the adjustability of the legs 19 on the bars 17, said bars 17 are provided with the grooves or recesses 20 to receive the inner ends of the legs 19. The legs 19 are provided with the slots 21 and bolts 22 pass through said slots and through openings in the bars 17 to secure the legs 19 rigidly in place when once adjusted. The lower ends of the legs 19 are forked, as at 23, so as to fit through the angular upper edge of the tin-pot; said legs, when in engagement with the edges of the pot and secured by the bolts 22, hold the frame 12 securely in place against lateral movement and at the same time act as a support for said frame.

The end cross-bars 16 of the frame 12, together with the upper cross-bars 24 form the guides and supports for the movable bearing-boxes 25. These bearing-boxes 25 are provided with the studs 26 and coil springs 27 are interposed between said bearing-boxes, said springs engaging the studs 26. One of the bearing-boxes 25 is secured rigidly in position within the guides by means of the set-screws 28. The other bearing-box is adapted to move in the guides when the pressure of the springs is overcome, and to provide for increasing or decreasing the tension of said springs. One of said springs engages a stud 29 on the movable washer 30. The set-screw 31 passes through the end piece 32 of the frame and by means of said set-screw the tension of the springs may be increased or diminished and a movable bearing-box may be adjusted so as to change its position with reference to the stationary bearing-box, as may be desired. The bearing-boxes 25 are held in position within the guides by means of the collars 33 secured to the shafts 34 and 35 by means of the set-screws 36. The shafts 34 and 35 are journaled in the bearing boxes 25. The shaft 34 has the cone pulley 36 which is connected up with the cone pulley 10 by means of the belt 37. The gear-wheel 38 on the shaft 34 meshes with the gear-wheel 39 on the shaft 35.

Mounted on the shafts 34 and 35 are the disks 40 and 41. These disks may be formed of cast-iron, cast-steel, or of a metal of relative hardness and are solid in the sense that the rim or periphery is rigidly formed, that the hub, whether spokes are employed, or whether the wheel, as illustrated, is formed without spokes, and furthermore in the sense that the rim or periphery forms a hard unyielding surface. These disks are secured to the shafts 34 and 35 by means of set-screws 42, and the disks 40, being mounted upon the shaft 34, are adapted to yield under pressure due to the shaft 34 being mounted in the movable spring actuated bearing-boxes 25. These disks, being solid in the sense above set forth, are very strong and durable and at the same time, by being mounted in the yielding bearing, they yield properly when in use, as will more fully hereinafter appear. The peripheries of the disks are slightly rounded to reduce the points of contact with the plates. Above the disks is the guide 44 which is adapted to direct the plates as they are drawn up by the disks onto a suitable conveyer by means of which they are carried off.

When our improved catcher is in use the worm-shaft 11 is driven by the engine or motor and power is transmitted therefrom to drive one of the rolls 3 as well as the shafts 34 and 35 by means of the connections described. The belt 37 is connected up with the cone-pulleys 10 and 36[a], so as to give the proper speed to the disks 40 and 41 to correspond with the travel of the rolls 3. It is apparent that the disks 40 should be arranged to rotate at such a speed as will feed the plates at the same or substantially the same rate of speed at which they emerge from the rolls 3. In other words, the plates should not be tracked at a greater rate of speed by the disks 40 nor should they be retarded in their travel. This uniformity of speed is readily effected by means of the cone-pulleys. The plates, as they are fed up by the rolls 3 are caught by the disks and carried up thereby. One set of disks being mounted on a moving shaft, the said disks will yield as may be necessary to prevent too great pressure on the plates, while at the same time they will bear against the plates with sufficient friction to catch and deliver the plates. By the movement of the yielding shaft with the solid hard-faced disks, we obtain a much stronger construction and the disks, being made solid, will not get out of order, and their life is greatly increased, while the marking of the plates is practically eliminated. By having the peripheries of the disks slightly rounded, the contact with the sheet is reduced and the hard-faced periphery gives a wearing face which has great lasting qualities. If it is necessary to change the rolls 3 and to insert ones of smaller or larger diameter, the cone-pulleys provide for the graduating of the speed of the shafts carrying the disks so as to have them travel at the proper rate of speed to catch the plates, withdraw them from the rolls, and obtain the desired speed. When it is necessary to change the rolls 3, or for any other purpose it is desired to get access to the tin-pot, the frame 12 may be swung out of the way, and in order to do this, it is necessary to loosen the bolts 22 so as to allow the legs 19 to be free from engagement with the edges of the tin-pot, whereupon the frame 12 may be readily swung to one side so as to give free access to the tin-pot.

What we claim is:—

1. In an apparatus for the manufacture of tin or like coated plates, the combination with the tin-pot and rolls, of a horizontally swinging frame, and rotary disks carried thereby.

2. In an apparatus for the manufacture of tin or like coated plates, the combination with a tin-pot and rolls, of a rotary vertical mast, a frame carried thereby, and rotary disks carried by said frame.

3. In an apparatus for the manufacture of tin or like coated plates, the combination with the tin-pot and rolls, of a horizontally swinging frame, disks carried thereby, and legs on said frames adapted to engage the tin pot.

4. In an apparatus for the manufacture of tin or like coated plates, the combination with the tin-pot and rolls, horizontally swinging frame disks carried thereby, and adjustable legs having crotches adapted to engage the edges of the tin-pot.

5. In an apparatus for the manufacture of tin or like coated plates, the combination with the tin-pot and rolls, of a horizontally swinging frame, rotary disks carried thereby legs having slots, a bolt passing through said slots and connecting said legs to said bars, the lower end of said legs being crotched to engage the edge of the tin-pot.

6. In an apparatus for handling plates in the manufacture of tin or like coated plates, the combination with the tin-pot and rolls, of rotary shafts, and yieldingly mounted metal disks formed of metal relatively harder than the coating metal arranged at intervals thereon.

7. In an apparatus for handling plates in the manufacture of tin or like coated plates, the combination with the tin-pot and rolls, of yieldingly mounted bearing boxes, shafts journaled therein, and metal disks formed of metal relatively harder than the coating metal arranged at intervals thereon.

8. In apparatus for handling plates in the manufacture of tin or like coated plates, the combination with the tin-pot and rolls, of spring actuated bearing-boxes movable in guides, shafts journaled in said bearing-boxes, and metal disks formed of metal relatively harder than the coating metal arranged at intervals thereon.

9. In apparatus for handling plates in the manufacture of tin or like coated plates, the combination with the tin-pot and rolls, of bearing-boxes movable in guides, springs interposed between said bearing-boxes and an abutment, shafts journaled in said bearing-boxes, and metal disks formed of metal relatively harder than the coating metal arranged at intervals thereon.

10. In apparatus for handling plates in the manufacture of tin or like coated plates, the combination with the tin-pot and rolls, of bearing-boxes mounted in guides, one set of bearing-boxes being fixed, and the other movable in said guides and spring actuated, shafts journaled in said boxes, and metal disks formed of metal relatively harder than the coating metal arranged at intervals thereon.

SAVENIOUS C. STINER.
ROBERT H. KEHRING.

Witnesses:
GEO. B. HERWICK,
J. C. DEVENNY.